(12) United States Patent
King

(10) Patent No.: US 9,488,204 B2
(45) Date of Patent: Nov. 8, 2016

(54) JOINER FOR MODULAR FURNITURE

(75) Inventor: David Russell King, Turrella (AU)

(73) Assignee: King Furniture Australia Pty Ltd, Turrella, New South Wales (AU)

( * ) Notice: Subject to any disclaimer, the term of this patent is extended or adjusted under 35 U.S.C. 154(b) by 573 days.

(21) Appl. No.: 13/884,667

(22) PCT Filed: Oct. 26, 2011

(86) PCT No.: PCT/AU2011/001366
§ 371 (c)(1),
(2), (4) Date: Jul. 19, 2013

(87) PCT Pub. No.: WO2012/065209
PCT Pub. Date: May 24, 2012

(65) Prior Publication Data
US 2013/0302085 A1 Nov. 14, 2013

(30) Foreign Application Priority Data
Nov. 18, 2010 (AU) .................. 2010905124

(51) Int. Cl.
| F16B 12/00 | (2006.01) |
| F16B 12/32 | (2006.01) |
| A47B 87/00 | (2006.01) |
| A47C 13/00 | (2006.01) |
| A47C 19/02 | (2006.01) |
| A47C 31/00 | (2006.01) |
| F16B 7/04  | (2006.01) |
(Continued)

(52) U.S. Cl.
CPC ............ *F16B 12/32* (2013.01); *A47B 87/002* (2013.01); *A47C 13/005* (2013.01); *A47C 19/028* (2013.01); *A47C 31/003* (2013.01); *F16B 7/04* (2013.01); *A47B 97/00* (2013.01); *F16B 2001/0035* (2013.01); *Y10T 403/3906* (2015.01)

(58) Field of Classification Search
CPC . F16B 12/00; E04B 2002/7468; A47C 4/02; A47C 4/028; A47C 13/005; A47C 31/003
See application file for complete search history.

(56) References Cited

U.S. PATENT DOCUMENTS 3,292,328 A * 12/1966 Darling ............... E04B 2/82
52/238.1
3,635,521 A * 1/1972 Shivvers ............ A47B 85/04
297/125

(Continued)

FOREIGN PATENT DOCUMENTS

WO    WO-9702390 A1    1/1997

OTHER PUBLICATIONS

International Search Report and Written Opinion for PCT/AU2011/001366, mailed Nov. 23, 2011; ISA/AU.

*Primary Examiner* — Michael P Ferguson
(74) *Attorney, Agent, or Firm* — Harness, Dickey & Pierce, P.L.C.

(57) ABSTRACT

Disclosed herein is a joiner (10) comprising an elongate body (12) defining a longitudinal axis (14). Projections (16, 18) extend generally transversely from the body (12) at opposite ends thereof and two spaced apart magnets (20, 22) are located between the projections (16, 18). The magnets (20, 22) are adapted to magnetically connect the joiner (10) to ferrous metal anchor points (i.e. the frames 101, 201) of modular furniture to retain the projections (16, 18) in engagement with the frame of the respective unit of modular furniture (100, 200) and thereby to retain the units of modular furniture together.

10 Claims, 3 Drawing Sheets

(51) Int. Cl.
*A47B 97/00* (2006.01)
*F16B 1/00* (2006.01)

(56) References Cited

U.S. PATENT DOCUMENTS

| | | | |
|---|---|---|---|
| 3,852,935 A | 12/1974 | Jones | |
| 3,944,281 A * | 3/1976 | Piretti | A47B 87/00 297/248 |
| 3,986,312 A | 10/1976 | Calhoun et al. | |
| 5,313,754 A * | 5/1994 | Jensen | E04F 19/02 52/232 |
| 7,806,474 B2 * | 10/2010 | Wahl | A47C 13/005 297/248 |
| 8,528,972 B2 * | 9/2013 | Johnsson | A47C 13/005 297/233 |
| 2010/0196088 A1 | 8/2010 | Johnsson | |

* cited by examiner

JOINER FOR MODULAR FURNITURE

CROSS-REFERENCE TO RELATED APPLICATIONS

The present application claims priority from Australian Patent Application No. 2010905124 and is the US national phase application of International Patent Application No. PCT/AU2011/001366 (Publication No. WO 2012/065209), the content of which is incorporated herein by reference.

BACKGROUND

The present disclosure relates to a joiner for modular furniture. The joiner has been developed primarily for use in joining modular, steel frame, lounge suites and will be described hereinafter with reference to this application. However, it will be appreciated that the joiner may also be used in other applications, such as in joining cabinets, boxes or any other items which have an inside edge and a metal piece or magnet attached.

Modular lounge suites, or "sectionals", have many benefits, such as the ability to reconfigure the lounge suite based on space constraints or for aesthetic reasons, along with the ability to separate units of the suites to facilitate transport and storage.

Most known modular lounge suites are typically not connected together and rely on frictional engagement of each unit of the modular lounge suite with the floor to retain the units together. A disadvantage of this joining technique is that the units of the modular lounge suite can move apart when forces in excess of the frictional resistance between the units and the floor are applied to the lounge.

To address this problem, a known method of joining modular furniture includes providing first and second coupling elements on adjoining units of the modular furniture, with the coupling elements being engageable upon raising of one of the adjoining units relative to the other, alignment of the coupling elements, and lowering of the raised unit to engage the coupling elements and retain the adjoining units together. A disadvantage of this joining technique is that one of the adjoining units must be lifted, which can be difficult if the unit is heavy, to join the adjoining units together. A further disadvantage is that alignment of the coupling elements of the adjoining units can be a tedious task.

Another known method of joining units of modular furniture together involves installing a bracket between the units of modular furniture and fastening the bracket to the furniture using screws or bolts. A disadvantage of this method is that fastening the brackets is time consuming, tedious and requires special tools and at least some degree of skill. A further disadvantage is that the screw or bolt fasteners must be removed if a user wishes to reconfigure the units of modular furniture.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided a joiner for units of modular furniture having a frame and ferrous metal anchor points associated with the frame, the joiner comprising:

an elongate body defining a longitudinal axis;

projections extending generally transversely from the body at opposite ends thereof; and at least one magnet located between the projections, the magnet being adapted to magnetically connect the joiner to the ferrous metal anchor points of the furniture to retain the projections in engagement with the frame of the respective unit of modular furniture and thereby to retain the units of modular furniture together.

The joiner may comprise two spaced apart magnets, each located between the projections and each adapted to magnetically connect the joiner to a respective one of the units of modular furniture to retain each of the projections in engagement with the frame of the respective unit of modular furniture and thereby to retain the units of modular furniture together.

The projections may be adapted to engage sides of the frames of the furniture. In such embodiments, the projections may be in the form of flanges. The projections may comprise a bent portion, such that a terminal end of each projection extends toward the end of the body associated with the other projection. The terminal end of each projection may be spaced apart from the body by a predetermined distance measured normal to the longitudinal axis of the body. The predetermined distance may in some embodiments be at least 10 mm, in some embodiments less than 50 mm and in some embodiments between around 10 mm and around 30 mm. In some embodiments, the elongate body may have an adjustable length such that the predetermined distance may be adjustable. The elongate body may be formed of two parts that are axially slidable relative to one another to facilitate adjustment of the length of the elongate body.

In some embodiments, the projections may be adapted to engage in openings in the frames. In such embodiments, the projections may be in the form of prongs.

The body may comprise one or more locating recess, corresponding in shape to the at least one magnet, the or each recess being adapted to locate one of the at least one magnets.

The body and projections may be formed in integral one-piece construction. For example, the body and projections may be formed by deforming a piece of ferrous metal plate. The at least one magnet may be magnetically connected to the body. Alternatively, the at least one magnet may be mechanically or chemically fastened to the body. In one embodiment, the body has a plastic coating. The plastic coating may have openings therein at positions corresponding with the one or more locating recess, so as to expose the underlying body for direct engagement of the at least one magnet therewith. The projections may also have a plastic coating.

In a second aspect, there is provided a method of connecting together units of modular furniture having a frame and ferrous metal anchor points associated with the frame, said method comprising:

providing a joiner comprising:

an elongate body defining a longitudinal axis;

projections extending generally transversely from the body at opposite ends thereof; and at least one magnet located between the projections, magnetically connecting the joiner to the ferrous metal anchor points of the furniture to retain the projections in engagement with the frame of the respective unit of modular furniture and thereby to retain the units of modular furniture together.

The joiner may comprise two spaced apart magnets, each located between the projections and each adapted to magnetically connect the joiner to a respective one of the units of modular furniture to retain each of the projections in engagement with the frame of the respective unit of modular furniture and thereby to retain the units of modular furniture together.

The projections may be adapted to engage sides of the frames of the furniture. In such embodiments, the projections may be in the form of flanges. The projections may comprise a bent portion, such that a terminal end of each projection extends toward the end of the body associated with the other projection. The terminal end of each projection may be spaced apart from the body by a predetermined distance measured normal to the longitudinal axis of the body. The predetermined distance may in some embodiments be at least 10 mm, in some embodiments less than 50 mm and in some embodiments between around 10 mm and around 30 mm. In some embodiments, the elongate body may have an adjustable length such that the predetermined distance may be adjustable. The elongate body may be formed of two parts that are axially slidable relative to one another to facilitate adjustment of the length of the elongate body.

In some embodiments, the projections may be adapted to engage in openings in the frames. In such embodiments, the projections may be in the form of prongs.

The body may comprise one or more locating recess, complimentary in shape to the at least one magnet, the or each recess being adapted to locate one of the at least one magnets.

The body and flanges may be formed in integral one-piece construction. For example, the body and flanges may be formed by deforming a piece of ferrous metal plate. The at least one magnet may be magnetically connected to the body. Alternatively, the at least one magnet may be mechanically or chemically fastened to the body. In one embodiment, the body has a plastic coating. The plastic coating may have openings therein at positions corresponding with the one or more locating recess, so as to expose the underlying body for direct engagement of the at least one magnet therewith. The projections may also have a plastic coating.

BRIEF DESCRIPTION OF THE DRAWINGS

An embodiment of the joiner will now be described, by way of example only, with reference to the accompanying drawings in which.

DETAILED DESCRIPTION

Figure 1:
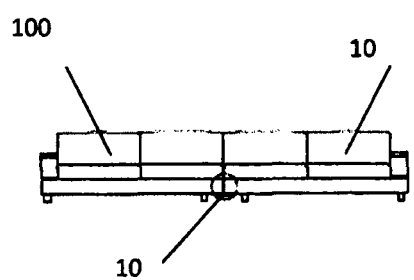
FIG. 1 is a front elevational view of two units of modular furniture connected together with a joiner.
Figure 1A:
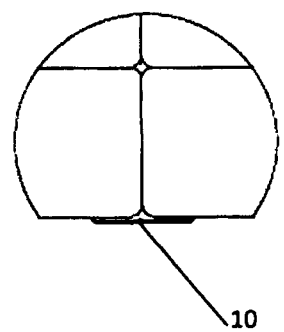
FIG. 1a is an enlarged view of the circled portion of FIG. 1.
Figure 2:
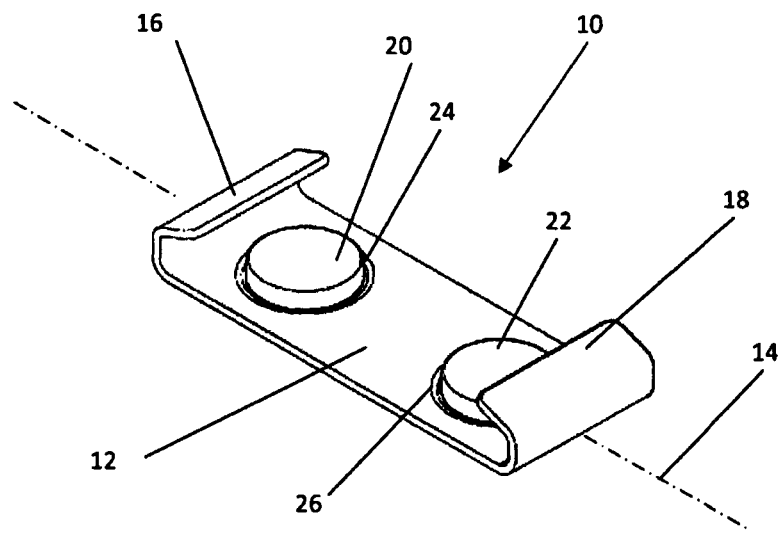
FIG. 2 is a perspective view of the joiner of FIG. 1.

Referring to the drawings, there is provided a joiner 10 for units of modular furniture, in the form of units of a modular lounge suite 100, 200, having a frame 101, 201 and ferrous metal anchor points associated with the frame. In the illustrated embodiment, the frame is formed of ferrous metal and the anchor points are parts of the frame. In other embodiments, however, the frame may be formed from a non magnetic material, such as timber, and may have ferrous metal anchor points attached thereto.

The joiner 10 comprises an elongate body 12 defining a longitudinal axis 14. Projections 16, 18 extend generally transversely from the body 12 at opposite ends thereof and two spaced apart magnets 20, 22 are located between the projections 16, 18. The magnets 20, 22 are adapted to magnetically connect the joiner 10 to the ferrous metal anchor points (i.e. the frames 101, 201) of the furniture to retain the projections 16, 18 in engagement with the frame of the respective unit of modular furniture 100, 200 and thereby to retain the units of modular furniture together.

Figure 4:
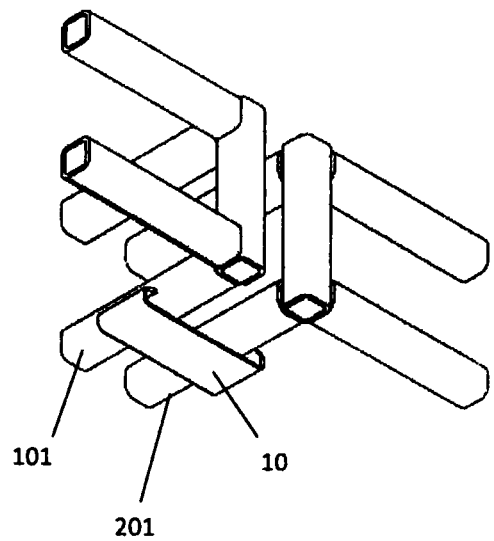
FIG. 4 is a perspective underside view of the circled portion of FIG. 1, with upholstery and cushioning layers of the modular furniture removed to more clearly show the relationship between the joiner and the frames of the units of modular furniture.
Figure 5:
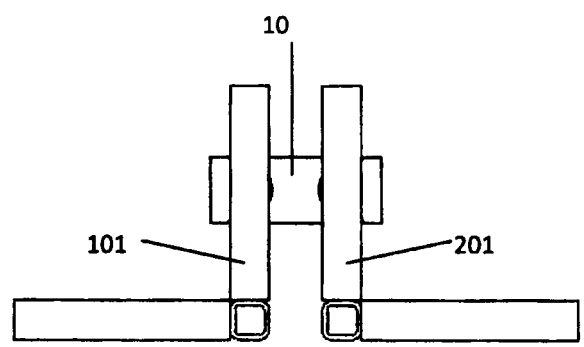
FIG. 5 is a plan view of the circled portion of FIG. 1, with upholstery and cushioning layers of the modular furniture removed to more clearly show the relationship between the joiner and the frames of the units of modular furniture.

The projections 16, 18 are in the form of flanges having free terminal ends 16a, 18a. The flanges have intermediate bent portions 16b, 18b, which are configured such that the terminal end 16a, 18a of each projection extends toward the end of the body 12 associated with the other projection 18, 16. The terminal ends 16a, 18a are adapted to engage sides of the frames of the furniture, as best seen in FIG. 4. The terminal ends 16a, 18a of each projection are spaced apart from the body 12 by a predetermined distance of approximately 10 mm to 15 mm measured normal to the longitudinal axis 14 of the body.

The body 12 comprises locating recesses 24, 26 for locating the magnets 20, 22. The locating recesses 24, 26 are of complimentary shape to the magnets 20, 22.

The body 12 and flanges 16, 18 are formed in integral one-piece construction by deforming a piece of ferrous metal plate. A plastic coating is provided over the body 12 and flanges 16, 18. Openings in the plastic coating are provided at locations corresponding with the locating recesses 24, 26 to facilitate the magnets 20, 22 being directly magnetically connected to the body 12.

Figure 3:
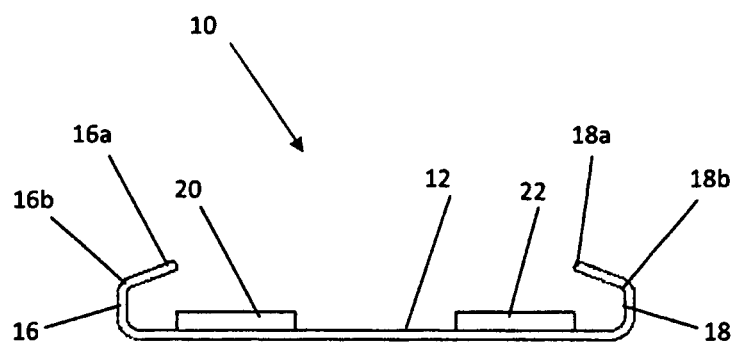
FIG. 3 is a front elevational view of the joiner of FIG. 1.

In use, to join units of modular furniture 100, 200 together, the units of modular furniture are simply brought into a desired configuration beside one another and the joiner 10 is then magnetically connected to the frames 101, 201 of the adjoining units of modular furniture to retain the furniture in the desired configuration. FIGS. 3 and 4 show frames 101, 201 of adjoining units of modular furniture connected together with the joiner 10. To reconfigure the units of modular furniture 100, 200, the joiner 10 is simply removed by applying manual effort in excess of the magnetic force of the magnets 20, 22.

It will be appreciated that the illustrated joiner 10 provides significant benefits over conventional systems for units joining modular furniture. For example, the joiner 10 is relatively quick and easy to install, since it requires no special tools and no special skills. Also, the joiner 10 is easily removable to facilitate reconfiguration of units of modular furniture.

It will also be appreciated by persons skilled in the art that numerous variations and/or modifications may be made to the above described embodiments without departing from the broad general scope of the present disclosure. The present embodiments are, therefore, to be considered in all respects as illustrative and not restrictive. Examples of potential variations and/or modifications include, but are not limited to:

- the projections being in the form of prongs adapted to engage in openings in the frames 101, 201;
- the magnets 20, 22 could be installed on the furniture 100, 200 and the joiner 10 could be attached to these magnets;
- the frames 101, 201 could be timber and have a small piece of ferrous metal, such as flat steel or steel angle, attached thereto for engagement by the magnets 20, 22;
- the magnets 20, 22 may be mechanically or chemically fastened to the body 12; and/or
- the body 12 may have an adjustable length such that the distance between the flanges 16, 18 may be adjusted (e.g. the body 12 may be formed of two parts that are axially slidable relative to one another to facilitate adjustment of the length of the body 12 and thereby the distance between the flanges 16, 18). Alternatively, joiners 10 of various fixed lengths may be provided.

The invention claimed is:

1. A joiner joining adjacent units of modular furniture, each unit having a frame comprising an elongated frame member extending along a peripheral edge thereof and having a ferrous metal anchor point, the joiner comprising:
    an elongate substantially planar body defining a longitudinal axis;
    a pair of opposing projections, each projection comprising a flange extending generally transversely from an upper surface of the body at a respective longitudinal end thereof;
    wherein a terminal end of each projection is spaced apart from the body by a predetermined distance measured normal to the longitudinal axis of the body, and
    wherein the terminal ends of the projections engage sides of adjacent parallel frame members of the units of modular furniture; and
    at least one magnet located between the projections and affixed to the body, the magnet magnetically connecting the joiner to the ferrous metal anchor points of the furniture to retain the projections in engagement with the frame members of the units of modular furniture and thereby to retain the units of modular furniture together;
    wherein the body comprises a locating recess corresponding to each at least one magnet, each recess receiving one of the at least one magnets.

2. The joiner according to claim 1, wherein said at least one magnet comprises two spaced apart magnets, each located between the projections and each adapted to magnetically connect the joiner to a respective one of the units of modular furniture to retain each of the projections in engagement with the frame member of a respective unit of modular furniture and thereby to retain the units of modular furniture together.

3. The joiner according to claim 1, wherein the projections comprise a bent portion, such that the terminal end of each projection extends toward the end of the body associated with the other projection.

4. The joiner according to claim 1, wherein the predetermined distance is at least 10 mm.

5. The joiner according to claim 1, wherein the predetermined distance is less than 50 mm.

6. The joiner according to claim 1, wherein the predetermined distance is between around 10 mm and around 30 mm.

7. The joiner according to claim 1, wherein the projections are adapted to engage in openings in the frame members of the units of the modular furniture.

8. The joiner according to claim 7, wherein the body and projections have a plastic coating.

9. The joiner according to claim 1, wherein the at least one magnet is magnetically connected to the body.

10. A method of connecting together units of modular furniture each having a frame and a ferrous metal anchor points associated with the frame, said method comprising:
    providing a joiner according to claim 1; and
    magnetically connecting the joiner to the ferrous metal anchor points of the furniture to retain the projections in engagement with the frame members of the units of modular furniture and thereby to retain the units of modular furniture together.

* * * * *